United States Patent
Balliet et al.

(10) Patent No.: US 8,124,287 B2
(45) Date of Patent: Feb. 28, 2012

(54) CONTROLLING AN AMOUNT OF LIQUID WITHIN A FUEL CELL

(75) Inventors: Ryan J. Balliet, Oakland, CA (US); Carl A. Reiser, Stonington, CT (US); Timothy W. Patterson, East Hartford, CT (US)

(73) Assignee: UTC Power Corporation, South Windsor, CT (US)

( * ) Notice: Subject to any disclaimer, the term of this patent is extended or adjusted under 35 U.S.C. 154(b) by 368 days.

(21) Appl. No.: 12/516,398

(22) PCT Filed: Dec. 22, 2006

(86) PCT No.: PCT/US2006/062530
§ 371 (c)(1),
(2), (4) Date: May 27, 2009

(87) PCT Pub. No.: WO2008/088316
PCT Pub. Date: Jul. 24, 2008

(65) Prior Publication Data
US 2010/0086811 A1    Apr. 8, 2010

(51) Int. Cl.
*H01M 8/06* (2006.01)

(52) U.S. Cl. .................. 429/414; 429/434; 429/432

(58) Field of Classification Search .................. 429/443, 429/444, 450, 413, 414, 433, 434, 432
See application file for complete search history.

(56) References Cited

U.S. PATENT DOCUMENTS

| | | | |
|---|---|---|---|
| 6,024,848 A | 2/2000 | Dufner et al. | |
| 2003/0186093 A1 | 10/2003 | St-Pierre et al. | |
| 2003/0224228 A1* | 12/2003 | Reiser et al. | ............ 429/13 |
| 2004/0224192 A1 | 11/2004 | Pearson | |
| 2006/0240302 A1 | 10/2006 | Senner et al. | |

OTHER PUBLICATIONS

Search Report and Written Opinion mailed on Apr. 28, 2008 for PCT/US2006/62530.
Notification of Transmittal of International Preliminary Examination Report, dated Mar. 4, 2009, PCT/US06/62530.

* cited by examiner

*Primary Examiner* — Javaid Nasri
(74) *Attorney, Agent, or Firm* — Carlson, Gaskey & Olds, P.C.

(57) ABSTRACT

A method of controlling an amount of liquid in a fuel cell includes increasing the oxygen utilization within the fuel cell to increase heat. The heat reduces the amount of liquid in the fuel cell. A disclosed example method includes decreasing a supply of air to the fuel cell to lower a fuel cell voltage by increasing the oxygen utilization. The example method includes maintaining an essentially electrical current density while decreasing the supply of air.

21 Claims, 2 Drawing Sheets

CONTROLLING AN AMOUNT OF LIQUID WITHIN A FUEL CELL

1. FIELD OF INVENTION

This invention generally relates to fuel cells. More particularly, this invention relates to controlling an amount of liquid within a fuel cell.

2. DESCRIPTION OF THE RELATED ART

Fuel cell assemblies are well known. In some examples, fuel cells include a polymer electrolyte membrane (PEM) positioned between porous carbon electrodes containing a platinum catalyst. A gas diffusion layer is adjacent each electrode. One of the electrodes operates as an anode while the other operates as a cathode. An example fuel cell utilizes supplies of hydrogen and air, and may generate liquid and thermal byproducts.

Under some operating conditions, fuel cell performance may be compromised. For example, obstructions in the gas diffusion layer, such as frozen water, may impede water transport from the cathode electrode to the cathode reactant stream and cause the electrode to flood. Flooding in the fuel cell degrades the performance of some fuel cells within a stack to varying degrees. Such flooding may result from starting a fuel cell power plant from a frozen condition, for example. Typical approaches for recovering from such flooding require extensive equipment, too much time, excessive fuel consumption or a combination of two or more of these.

It would be desirable to avoid the reduced fuel cell performance associated with flooding without the drawbacks mentioned above. This invention addresses that need.

SUMMARY

An example method of controlling an amount of liquid in a fuel cell includes increasing oxygen utilization within the fuel cell to increase heat. The heat reduces the amount of liquid in the fuel cell.

One example includes decreasing a supply of air to the fuel cell. This lowers the fuel cell voltage and increases the oxygen utilization. One example includes maintaining an essentially constant electrical current density while decreasing the supply of air.

One example device for controlling an amount of liquid within a fuel cell includes a regulator for regulating airflow to the fuel cell and a controller for controlling the regulator to adjust an amount of heat generated during operation of the fuel cell.

BRIEF DESCRIPTION OF THE DRAWINGS

These and other features of the present invention can be best understood from the following detailed description and drawings, of which the following is a brief description.

DETAILED DESCRIPTION

Figure 1:
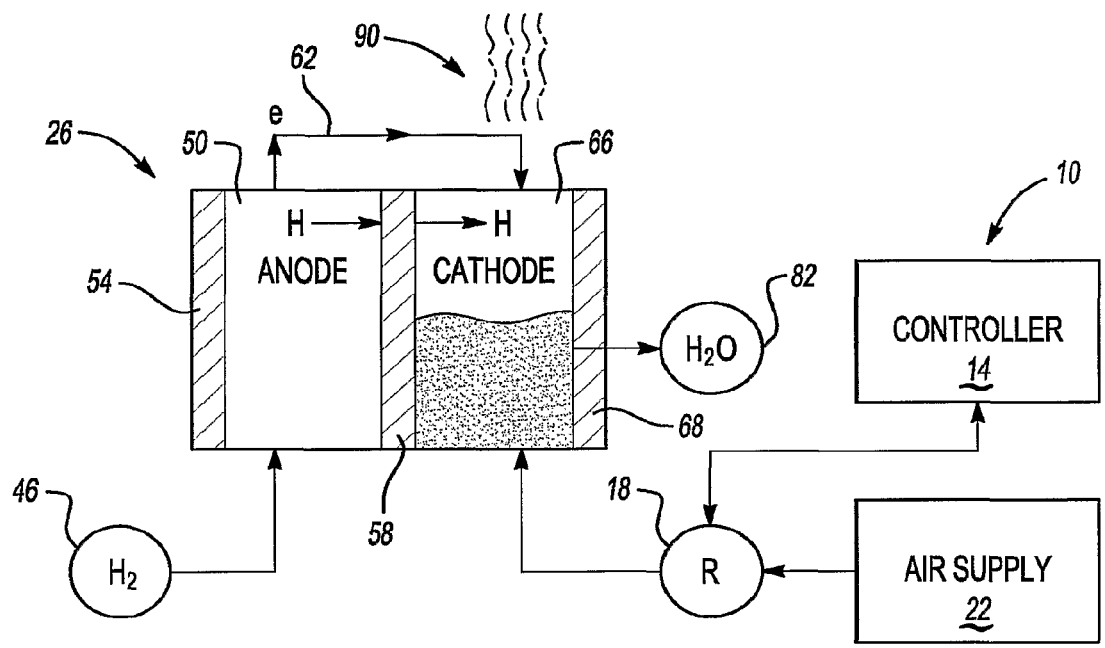
FIG. 1 is a partial schematic illustrating an example device designed according to an embodiment of this invention.

The example device 10 of FIG. 1 includes a controller 14 in communication with a regulator 18. An air supply 22 flows through the regulator 18 to a fuel cell stack assembly (CSA) 26. For simplicity and discussion purposes, only one cell is schematically shown, but the CSA 26 includes a plurality of cells as is known. The controller 14 controls the regulator 18 to adjust the flow of air from the air supply 22 into the CSA 26.

Air flowing from the air supply 22 to the CSA 26 includes oxygen. Reactions within the CSA 26 utilize the oxygen within the air from the supply 22. Restricting the flow of air from the air supply 22 to the CSA 26 decreases the air, and the associated oxygen, flowing to the CSA 26. As the air provided to the CSA 26 decreases, the CSA 26 utilizes a greater percentage of the oxygen within the CSA 26.

The example CSA 26 receives hydrogen from a fuel supply 46 at an anode 50 positioned between a gas diffusion layer 54 and a polymer electrolyte membrane 58 (PEM). Electrons from the hydrogen move from the anode 50 along a flow path 62 to a cathode 66 positioned between a gas diffusion layer 68 and the PEM layer 58. Protons pass directly through the PEM layer 58 to the cathode 66.

The example controller 14 controls the regulator 18 to regulate airflow moving from the air supply 22 to the example cathode 66. Air within the air supply 22 includes oxygen, thus by controlling the flow of air from the air supply 22 to the cathode 66, the amount of oxygen at the cathode 66 is accordingly controlled.

Hydrogen and oxygen combine proximate the cathode 66 and generate byproducts that include water 82 and heat. Reducing the amount of air moving from the air supply 22 to the cathode 66 increases the utilization of oxygen because a greater percentage of the available oxygen is used to combine with the hydrogen.

Increasing the utilization of oxygen combining with hydrogen lowers a voltage from the CSA 26. Further, lowering the voltage while maintaining an electrical current level produces heat. In this example, increasing the utilization of oxygen lowers the voltage on the cathode 66. Thus, the controller 14 controls the heat generated by the cathode 66 by manipulating the regulator 18 to control the oxygen utilization within the cathode 66. Operating the CSA 26 with a low voltage while maintaining a high electrical current maximizes heat release. In one example, a 0.1 V reduction in voltage on the cathode 66, while maintaining a 300 Amp current, increases the heat energy of the cathode 66 by 30 watts.

In another example, moving air to the CSA 26 after shorting out the CSA 26 may increase heat from the cathode 66. Shorting the CSA 26 lowers the voltage of the cathode 66, and the rate of air moving to the CSA 26 determines the current produced. Those skilled in the art will realize how to suitably short a CSA 26.

Water 82 may collect within the CSA 26 and flood the cathode 66 and areas proximate the cathode 66. Increasing the heat of the cathode 66 evaporates portions of the water 82 as schematically shown at 90. Water 82 may collect within other portions of the CSA 26. The same heat resulting from increased oxygen utilization may be used to control the level of water 82 within the cathode 66 and to prevent flooding of the cathode 66 or other portions of the CSA 26.

Figure 2:
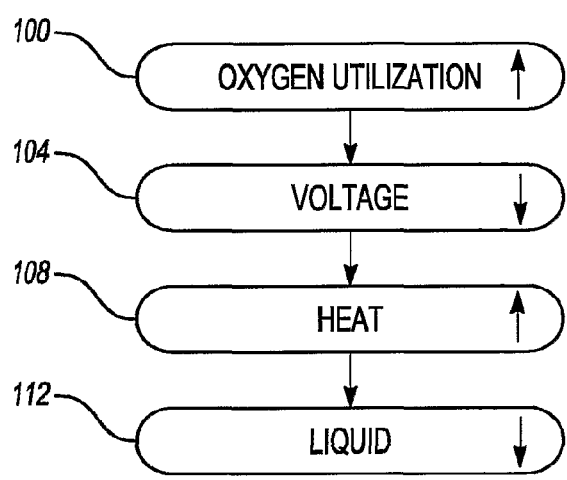
FIG. 2 schematically shows a method for controlling a level of liquid within a fuel cell.

As shown in the schematic of FIG. 2, increasing fuel cell oxygen utilization at 100 lowers a fuel cell voltage at 104. Lowering the fuel cell voltage at 104 increases heat within portions of the CSA as shown at 108. When the heat increases to an appropriate level, liquid within the fuel cell vaporizes (e.g., decreases) as shown at 112. The increased heat effectively vaporizes the liquid so that it may exit the CSA along with other gases flowing to an exhaust (not shown). Thus, increasing the oxygen utilization at 100 leads to lower liquid levels within the fuel cell at 112.

In one example, the controller 14 is programmed to control the airflow based on a determined temperature, a determined amount of water in the CSA 26 or both. Given this description, those skilled in the art will realize how to configure a controller to meet their particular needs.

Measuring a stoichiometric ratio within the fuel cell may indicate the oxygen utilization at 100. A stoichiometric ratio measurement of 1 indicates that all the oxygen entering the fuel cell is utilized. Thus a stoichiometric ratio measurement approaching 1 indicates increasing oxygen utilization.

Figure 3:
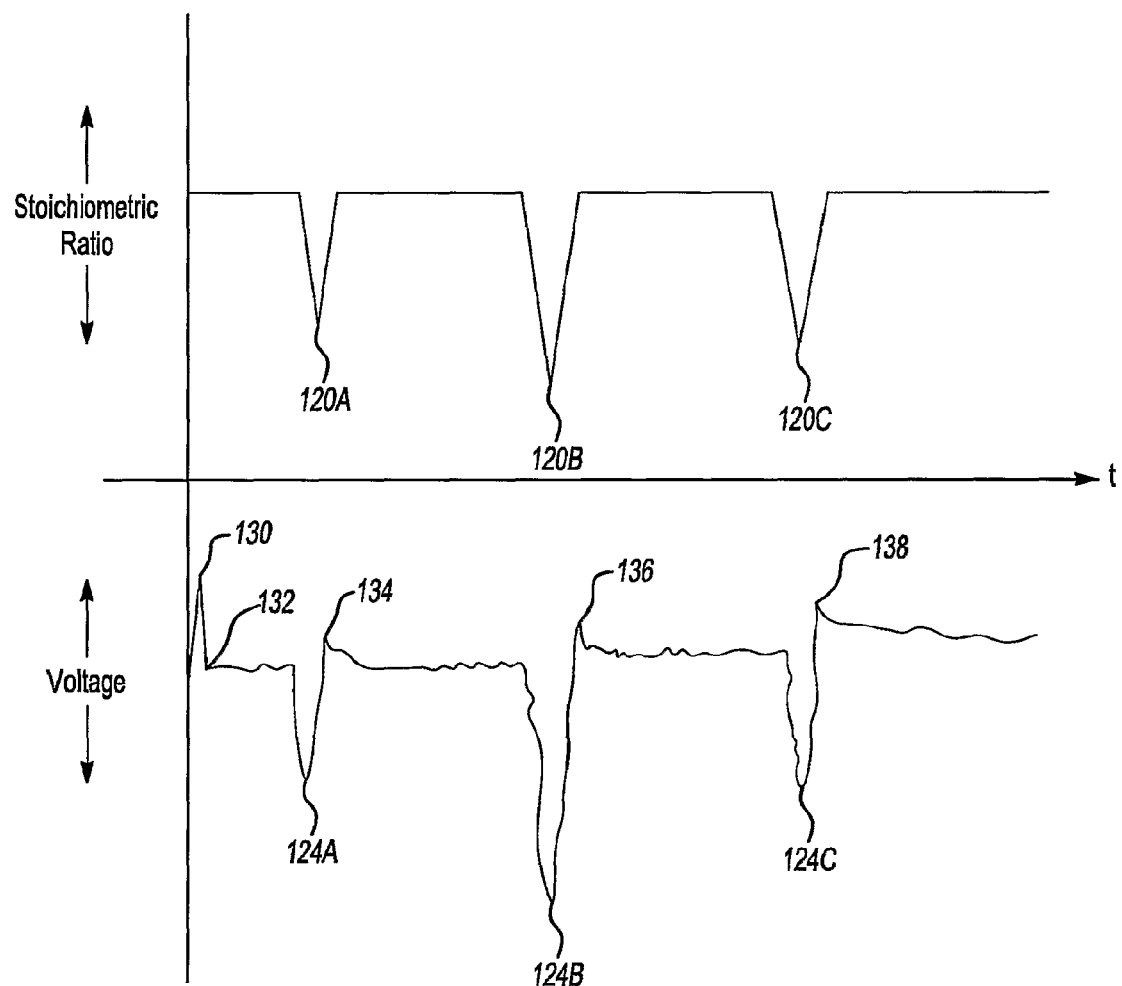
FIG. 3 graphically illustrates the relationship between air stoichiometry and fuel cell voltage.

As shown in the graphical representation of FIG. 3, reductions in the stoichiometric ratio at 120 corresponds to voltage drops 124. In this graphical example, the cell maintains a constant current density, which contributes to the voltage drops 124. Decreasing the stoichiometric ratio at 120 typically occurs in controlled bursts or pulses rather than decreases over an extended period of time. Accordingly, the controller 14 (FIG. 1) actuates the regulator 18 to generate bursts or pulses of reduced airflow into the cell.

An initial voltage at 130 is normally attainable from the CSA 26. A voltage drop occurs because of cathode flooding at 132. The reduced airflow and associated increased oxygen utilization at $124_A$ results in an increased voltage or performance at 134. Additional airflow reductions occur at $124_B$ and $124_C$. These provide reduced flooding and increased performance at 136 and 138, respectively. In this example, the voltage level at 138 is sufficiently close to the level at 130 that it is considered full recovery from the flooding and reduced performance shown at 132.

In one example, the airflow is reduced for a period in the range from a few seconds to several minutes. In the illustrated example, the reduced stoichiometric ratio at $124_A$ occurs for about 123 seconds, the reduction $124_B$ lasts about 83 seconds and the reduction at $124_C$ lasts about 295 seconds. The illustrated procedure includes an essentially constant current density of about 400 $m^A/cm^2$.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A method of controlling an amount of liquid in a fuel cell, comprising:
   increasing oxygen utilization within the fuel cell to increase heat; and
   using the heat to reduce an amount of liquid within the fuel cell.

2. The method of claim 1, including decreasing a supply of air to the fuel cell to increase the oxygen utilization.

3. The method of claim 2, including increasing the oxygen utilization to lower a voltage associated with the fuel cell.

4. The method of claim 3, including lowering the voltage to increase the heat.

5. The method of claim 2, including maintaining an essentially constant electrical current density while decreasing the supply of air.

6. The method of claim 2, including producing a decreasing voltage while increasing the oxygen utilization.

7. The method of claim 1, including increasing the heat to vaporize a liquid within the fuel cell.

8. The method of claim 1, including increasing the heat within an electrode to control the amount of liquid within the fuel cell.

9. The method of claim 1, including using a regulator to decrease airflow to the fuel cell.

10. The method of claim 1, including lowering a voltage associated with the fuel cell to increase the heat.

11. A method of controlling an amount of liquid in a fuel cell, comprising:
    lowering a voltage associated with the fuel cell to increase heat; and
    using the heat to reduce an amount of liquid within the fuel cell.

12. The method of claim 11, including decreasing a supply of air to the fuel cell while maintaining an electrical current density to lower the voltage.

13. The method of claim 11, including electrically shorting the fuel cell to lower the voltage.

14. The method of claim 11, including decreasing a supply of air to the fuel cell to increase oxygen utilization.

15. The method of claim 14, including increasing the oxygen utilization to lower the voltage associated with the fuel cell.

16. The method of claim 11, including increasing the heat to vaporize a liquid within the fuel cell.

17. A device for controlling an amount of liquid within a fuel cell, comprising:
    a regulator configured to regulate airflow that supplies oxygen to said fuel cell; and
    a controller configured to control said regulator to reduce an amount of the airflow for generating a desired amount of heat during operation of said fuel cell.

18. The device of claim 17, wherein said controller is configured to control said regulator to decrease the airflow to said fuel cell such that a voltage is decreased.

19. The device of claim 17, wherein said controller is configured to maintain a selected electric current within said fuel cell and to lower a voltage to increase heat.

20. The device of claim 17, wherein said controller is configured to increase heat to vaporize a liquid within said fuel cell.

21. The device of claim 17, wherein said controller is configured to control said regulator to increase oxygen utilization within said fuel cell.

* * * * *